(12) United States Patent  
Lupesko et al.

(10) Patent No.: US 11,763,154 B1  
(45) Date of Patent: Sep. 19, 2023

(54) MACHINE LEARNING SERVICES WITH PRE-TRAINED MODELS

(71) Applicant: Amazon Technologies, Inc., Seattle, WA (US)

(72) Inventors: Hagay Lupesko, San Mateo, CA (US); Anirudh Acharya, San Jose, CA (US); Lee Cheng-Che, Mountain View, CA (US); Lai Wei, San Ramon, CA (US); Kalyanee Chendke, Cupertino, CA (US); Ankit Khedia, Redwood City, CA (US); Vandana Kannan, Santa Clara, CA (US); Sandeep Krishnamurthy, Santa Clara, CA (US); Roshani Nagmote, San Mateo, CA (US)

(73) Assignee: Amazon Technologies, Inc., Seattle, WA (US)

(*) Notice: Subject to any disclaimer, the term of this patent is extended or adjusted under 35 U.S.C. 154(b) by 1,249 days.

(21) Appl. No.: 16/262,677

(22) Filed: Jan. 30, 2019

(51) Int. Cl.
*G06N 3/08* (2023.01)
*G06N 20/00* (2019.01)
*G06T 7/10* (2017.01)
*G06F 16/55* (2019.01)
*G06N 20/20* (2019.01)
*G06N 3/082* (2023.01)
*G06F 18/214* (2023.01)

(52) U.S. Cl.
CPC ............. *G06N 3/082* (2013.01); *G06F 16/55* (2019.01); *G06F 18/214* (2023.01); *G06N 20/00* (2019.01); *G06N 20/20* (2019.01); *G06T 7/10* (2017.01)

(58) Field of Classification Search
CPC ... G06N 3/082; G06T 7/10; G06F 16/55; G06N 20/20; G06N 20/00; G06K 9/6256
See application file for complete search history.

(56) References Cited

U.S. PATENT DOCUMENTS

| | | | |
|---|---|---|---|
| 8,095,480 | B2 | 1/2012 | Kristal et al. |
| 8,762,298 | B1 | 6/2014 | Ranjan et al. |
| 8,788,438 | B2 | 7/2014 | Kvernvik et al. |
| 8,838,511 | B2 | 9/2014 | Kristal et al. |
| 9,547,830 | B2 | 1/2017 | Eads |
| 9,635,101 | B2 | 4/2017 | Mathur et al. |
| 9,774,614 | B2 | 9/2017 | Patne et al. |
| 9,792,530 | B1 | 10/2017 | Wu et al. |
| 9,836,701 | B2 | 12/2017 | Chen et al. |
| 9,838,410 | B2 | 12/2017 | Muddu et al. |
| 10,003,605 | B2 | 6/2018 | Muddu et al. |
| 10,015,177 | B2 | 7/2018 | Muddu et al. |
| 10,055,685 | B1 | 8/2018 | Arel et al. |
| 10,104,101 | B1 | 10/2018 | Thakar et al. |
| 10,147,020 | B1 | 12/2018 | Hodson et al. |
| 10,410,114 | B2* | 9/2019 | Kang et al. .......... G06N 3/0454 |
| 2017/0017903 | A1* | 1/2017 | Gray et al. ............. G06T 11/60 |
| 2017/0185904 | A1* | 6/2017 | Padmanabhan et al. . G06N 5/04 |
| 2019/0354850 | A1* | 11/2019 | Watson et al. .......... G06N 3/08 |
| 2020/0125394 | A1* | 4/2020 | Gallego et al. .......... G06F 8/63 |

\* cited by examiner

*Primary Examiner* — Alan Chen
(74) *Attorney, Agent, or Firm* — Knobbe, Martens, Olson & Bear, LLP

(57) ABSTRACT

Features related to systems and methods for automated generation of a machine learning model based in part on a pretrained model are described. The pretrained model is used as a starting point to augment and retrain according to client specifications. The identification of an appropriate pretrained model is based on the client specifications such as model inputs, model outputs, and similarities between the data used to train the models.

20 Claims, 5 Drawing Sheets

MACHINE LEARNING SERVICES WITH PRE-TRAINED MODELS

BACKGROUND

A service provider may make a network service available for use by third parties. For example, the field of utility computing involves a service provisioning model in which a service provider makes computing resources and infrastructure management available to client devices on demand. For example, a user may wish to deploy a hosted machine learning service (e.g., an image processing service) to analyze image data such as of products, users, or documents. Image processing services can rely on sophisticated modeling and training to provide accurate analysis of image data. The modeling and training can be resource and time intensive operations and require significant understanding of the complexities contributing needed to produce a satisfactory model.

Network service models allow users to access networked resources (e.g., applications, services, and data) via a client program, such as a web browser. Network services, such as web services, provide programmatic access to networked resources including technology platforms (e.g., image processing applications and services) and data (e.g., image data and other databases) hosted on networked computers via a service interface. Generally speaking, a network service interface provides a standard, cross-platform API (Application Programming Interface) for communication between a client requesting some service to be performed and the service provider. In some embodiments, a network service interface may be configured to support the exchange of documents or messages including information describing the service request and response to that request. Such documents, or messages, may be exchanged using standardized or proprietary messaging protocols, such as the Hypertext Transfer Protocol (HTTP), and may be formatted in a platform-independent data format, such as eXtensible Markup Language (XML).

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Network services can be powerful tools that allow clients to perform a wide variety of processing operations. For example, image analysis algorithms can be applied to provide machine learning outputs for many domains, such as medical or health care, social networks, autonomous driving, and others. With advances in artificial intelligence, machine learning, and related applications, more and more users are engaging with such systems. Wide adoption, however, can be hindered in part because not all users in these domains have sufficient time or resources to deploy state-of-the-art solutions. The features described in this application provide an end-to-end solution to generate hosted machine learning services for users with little or no prior knowledge of artificial intelligence techniques based on pre-trained models that are dynamically adapted to the specific problem presented by the user. The model may be a neural network model (also known as an artificial neural network model), support vector machines, Bayesian networks, regression models, or the like.

With the increasing amount of data and computing power, deep learning has achieved magnificent success in image classification tasks. The intelligently designed neural networks are capable of accurately recognizing objects shown in an image for a specific domain. However, training a sophisticated neural network, often with a very large dataset, can take days even months. Furthermore, the trained model can only be generalized to perform similar recognition tasks (e.g., for the same object or within the same domain). For example, a machine learning model that is trained to classify digits will not accurately distinguish between a dog and a cat. To generate a classifier to identify additional or different object categories, one typically needs to re-train the model with corresponding training data.

The features described selectively re-train portions of an existing model to provide output values for a specified user task such as an image recognition, audio processing, natural language understanding, recommendations, classifications, segmentation, transcription, etc. Based on the requested model, a pre-trained model along with portions for training may be identified. In this way, a new model may be generated by fine tuning a pre-trained model. This provides an improvement over systems where each model is generated without any prior modeling. The improvement relates not only to the knowledge needed to generate the new model, but also the resources that are consumed to generate the new model.

Figure 1:
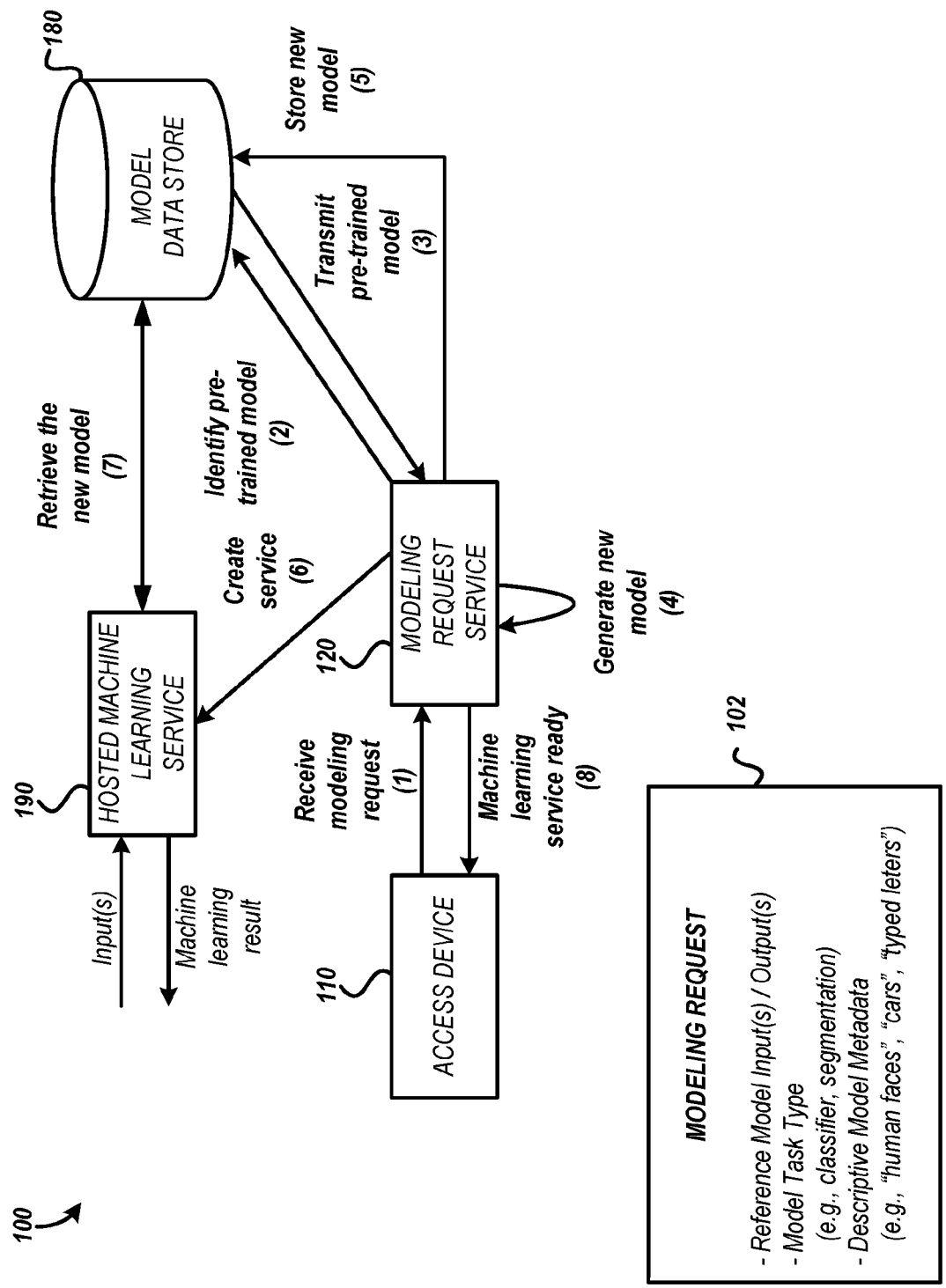
FIG. 1 is a block diagram showing an environment for generating an image processing service from a modeling request.

FIG. 1 is a block diagram showing an environment for generating a hosted machine learning service from a modeling request. The environment 100 includes several entities which communicate to generate one example of a hosted machine learning service 190. The hosted machine learning service 190 shown in FIG. 1 receives an image as an input and generates an image processing result (sometimes referred to as a prediction) as an output. The image processing result may indicate whether a particular object is shown in the input image, where a particular object is shown in the input image, or what object or objects are shown in the input image. In some embodiments, the image processing result includes a set of indications, each associated with a confidence in the result. For example, if the image provided to the hosted machine learning service 190 shows a basketball, the machine learning model for recognizing sporting goods may provide an image processing result indicating that a basketball is shown with a 90% confidence and a volleyball is shown with a 30% confidence, and a football is shown with a 1% confidence. In this way, the requesting device can perform further processing based not only on the recognized objects but also the model's confidence in the recognition.

In the embodiment shown in FIG. 1, the creation of the hosted machine learning service 190 is initiated by a modeling request 102. The modeling request 102 includes reference model input(s) or output(s). Model inputs may include images, audio files, tables of information, and, in some instances, annotations. For some input types, it may be desirable to also indicate a language for the input (e.g., English, Spanish, etc.). The outputs may include objects associated with an input, vectors of output values classifying respective inputs, or the like. In some embodiments, the modeling request 102 includes the input(s) or output(s) as part of the request. In some embodiments, the modeling request 102 includes a reference to a source of the input(s) or output(s) such as a network location of training image data. The modeling request 102 shown in FIG. 1 includes a model task type indicating a type of task the model should be trained to perform such as classify objects shown in an image, segment objects shown in an image, or other machine learning image processing tasks such as those related to computer vision. The modeling request 102 shown in FIG. 1 includes descriptive model metadata that indicates the objects or task associated with the requested model. The modeling request 102 may include an identifier for the client requesting the model. The identifier of the client may be used to identify a topical domain to which the requested model will apply. For example, if the client is a doctor, the topical domain for the requested model may be medical imaging. The domain may be identified based on a profile stored in a data store for the client. The request may include an identifier for the client which can be used to retrieve the profile to determine one or more domains associated with the client. The topical domain information for the client may be compared with domain information for existing models or clients that created the existing models. If the domain information for the request corresponds to domain information for an existing model, the existing model may be included in the process of generating the new machine learning model.

The access device 110 transmits the modeling request 102 to a modeling request service 120. The modeling request service 120 interprets the modeling request 102 and coordinates the generation of a hosted machine learning service 190 for the modeling request 102. In previous systems, a new image model may be trained to perform the task specified in the modeling request 102. However, training each model from scratch for each request can be time or resource intensive. Embodiments of the present disclosure can avoid this inefficiency and high resource demand.

To address training inefficiencies, the modeling request service 120 identifies a pre-trained model that is stored in a model data store 180 based on the request. For example, if the model data store 180 includes a previously trained models associated with descriptive metadata corresponding to the descriptive metadata provided in the modeling request 102, the previously trained models may be included in the requested model. Metadata, such as domain information, may be associated with a client requesting the previously trained models and used to identify a previously trained model. The shape of the type of input or output to the model may be used to identify a previously trained model. For example, if the modeling request includes five inputs corresponding to five different features of an image, a number of inputs to previously trained models may be compared to identify those with a similar number. The shape may indicate a number of values input or output for the model. The shape may indicate a data type for an input or output value for the machine learning model.

When the modeling request 102 includes training data, characteristics of the training data may be compared with data used to train previous models. For example, the distributions of data or types of data (e.g., JPG, GIF, MPG, MP3, XML, TXT, CSV, etc.) may be compared. In instances where multiple pre-trained models meet the criteria specified by the modeling request service 120, the accuracy of the previous model may be assessed. For example, at least a portion of the inputs may be processed with the candidate pre-trained models and the results compared with expected results. The pre-trained model providing outputs that most closely approximate the expected results may be selected as the pre-trained model to being generation of the new model. The architecture of the pre-trained model may be used to further distinguish between possible pre-trained models. For example, a model that has fewer layers or nodes may provide a result more efficiently than a model having more layers or nodes.

As used herein a "data store" may be embodied in hard disk drives, solid state memories and/or any other type of non-transitory computer-readable storage medium accessible to or by a device such as an access device, server, or other electronic computing device described. A data store may also or alternatively be distributed or partitioned across multiple local and/or remote storage devices as is known in the art without departing from the scope of the present disclosure. In yet other embodiments, a data store may include or be embodied in a data storage web service.

Based on the one or more of the factors described, the modeling request service 120 identifies the trained models to include in the new machine learning model for the modeling request 102.

Once the pre-trained model is identified, the modeling request service 120 may generate the new model by fine tuning the pre-trained model according to the modeling request. Fine tuning may include augmenting the pre-trained model by adding neural network or other processing layers to the pre-trained model. A new layer may shape the input or output of the pre-trained model to suite the modeling request. For example, a pre-trained model may categorize a user based on historical interactions with a system into one of 1,000 categories. The modeling request 102 may specify a similar input vector of interactions but desire only categorization into one of ten categories. In this instance, an additional output layer to project the 1,000 categories into ten may be added to the pre-trained model.

Fine tuning may include retraining the pre-trained model. For example, it may be desirable to process the reference model input(s) and adjust weights between nodes of the pre-trained model. The adjusted weights may be included in the new model to more closely provide the outputs expected for the modeling request rather than the data used to train the pre-trained model. In some implementations, the modeling request service 120 may identify portions of the pre-trained model to retrain. For example, a pre-trained model may include an input layer of nodes connected to a first layer of hidden nodes. The first layer of hidden nodes may be connected to a second layer of hidden nodes which in turn is connected to an output layer. It may be desirable to adjust the weights of connections between the second layer of hidden nodes and the output layer. The identification of layers to modify may be specified through annotations on the pre-trained model. For example, when the pre-trained model is added to the model data store 180, the mutable layers may be specified using annotation information. As one example, a model may be annotated by the model designer to identify two portions, a body which extracts features of the input values and a head which classifies the extracted features to provide one or more output values. In such examples, the body may be retained while the head may be retrained. In some implementations, the model may be assessed such as using artificial intelligence of heuristics to determine what aspect of the model can be fine-tuned.

After generating the new machine learning model, the modeling request service 120 shown in the environment 100 of FIG. 1 transmits the trained model to the model data store 180. The transmission causes the trained model to be included for consideration for future model requests. An identifier may be associated with the trained model to aid in identifying the model.

The modeling request service 120 generates the hosted machine learning service 190 based on the trained model. Generating the hosted machine learning service 190 may include creating a service instance to receive image requests which are processed using the trained model to provide image processing results.

Figure 2:
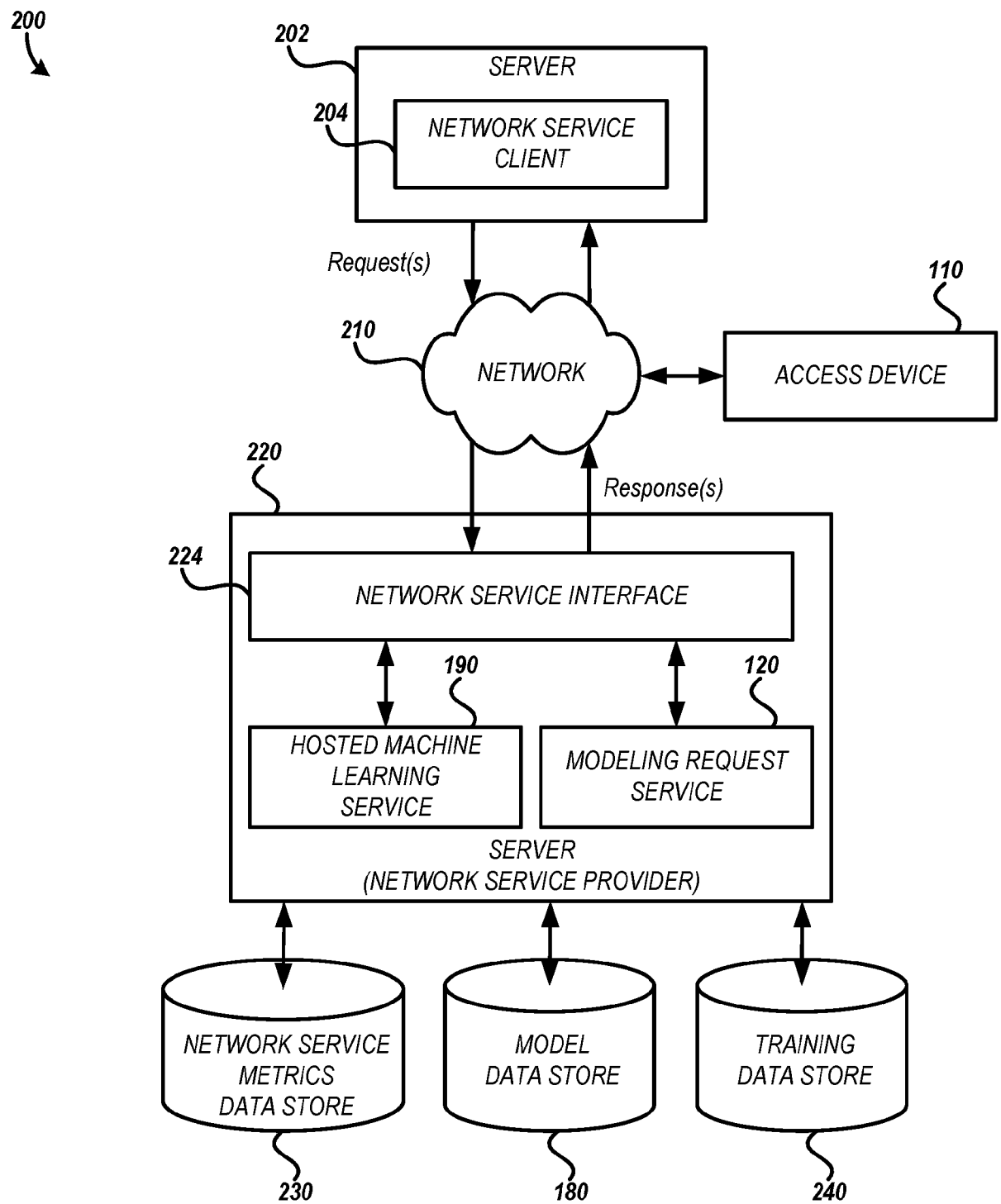
FIG. 2 is a block diagram showing an environment including a network service provider for providing hosted machine learning services.

FIG. 2 is a block diagram showing an environment including a network service provider for providing hosted machine learning services. The environment 200 shows the interaction between a network service client 204 and a network service provider server 220. In this embodiment, a network service interface 224 is implemented on a server 220 coupled to a network 210. The server 220 may be referred to as a "network service provider." The server 220 includes one or more applications or services such as a hosted machine learning service 190 and a modeling request service 120. The server 220 may be coupled to data storage 140 for storing information in database 142.

In the embodiment shown in FIG. 2, the server 202 is coupled to the network 210. The server 202 includes a network service client 204. The network service client 204 programmatically accesses an application or service (e.g., the hosted machine learning service 190 or the modeling request service 120) of the server 220 via the network service interface 224. The network service interface 224 provides a programmatic interface via an API through which at least some functionality of an application or service (e.g., the hosted machine learning service 190 or the modeling request service 120) is programmatically accessed by a network service client 204. The server 202 or the server 220 may provide a network service such as a web site accessible by an access device 110 via browsers or other applications executing on the access device 110. In some embodiments, the network service client 204 is configured to access at least some functionality of an application or service of the server 220 and/or at least some data in a data store coupled with the server 220 (e.g., the network service metrics data store 230, the model data store 180, or the training data store 240) via the network service interface 224. In some embodiments, the network service client 204 provides a network service to other client servers or access devices such as a web application.

To access the hosted machine learning service 190, network service client 124 sends a request message to network service interface 224 via the network 210. The network service provider server 220 identifies a requested service based on the request and provides the request to the appropriate service For example, if the request include modeling parameters to create or update an hosted machine learning service, the network service interface 224 detects the modeling parameters as one indicator of the destination for the request. In some embodiments, the endpoint to which the request is presented identifies the application or service to handle the request. For example, the modeling request service 120 may be hosted at a known network location (e.g., http://networkserviceprovider.com/services/modelingService). In such embodiments, requests presented to the endpoint will be routed to the modeling request service 120. The application provides a response to the request to the network service interface 224 which, in turn, provides the response to the device that transmitted the request (e.g., the server 202 or the access device 110).

As the network service interface 224 receives requests and transmits responses, the network service interface stores information regarding the service interactions in a network service metrics data store 230. The information regarding the service interactions may include a number of interactions with a service in total or per interaction type (e.g., search results, selection for inclusion in other models, image processing interactions, etc.). The service interaction information may include one or more of: number of requests routed to the service, number of responses sent from the service, the confidence of the responses, time taken for a service to respond to a request, resources utilized by a service to respond to a request, or memory requirements for the service.

In some embodiments, the network service interface 224 monitors a service to collect metrics while it is processing. For example, the selections made by the modeling request service 120 may be stored to identify which models or training data were used to create new machine learning models. A training data store 240 is included in the embodiment shown in FIG. 2 to store data used to train one or more machine learning model.

As another example, a model generated by the modeling request service 120 may be published as a new hosted machine learning service of the server 220. As shown in FIG. 2, the hosted machine learning service 190 may represent a final result of a request processed by the modeling request service 120. The interaction metrics for the hosted machine learning service 190, or similar hosted machine learning services, may include a number of requests, accuracy for responding to an image processing request, or the like. As with the modeling interaction information, the network service interface 224 or the hosted machine learning service 190 are configured to store the image processing information in a network service metrics data store 230.

Figure 3:
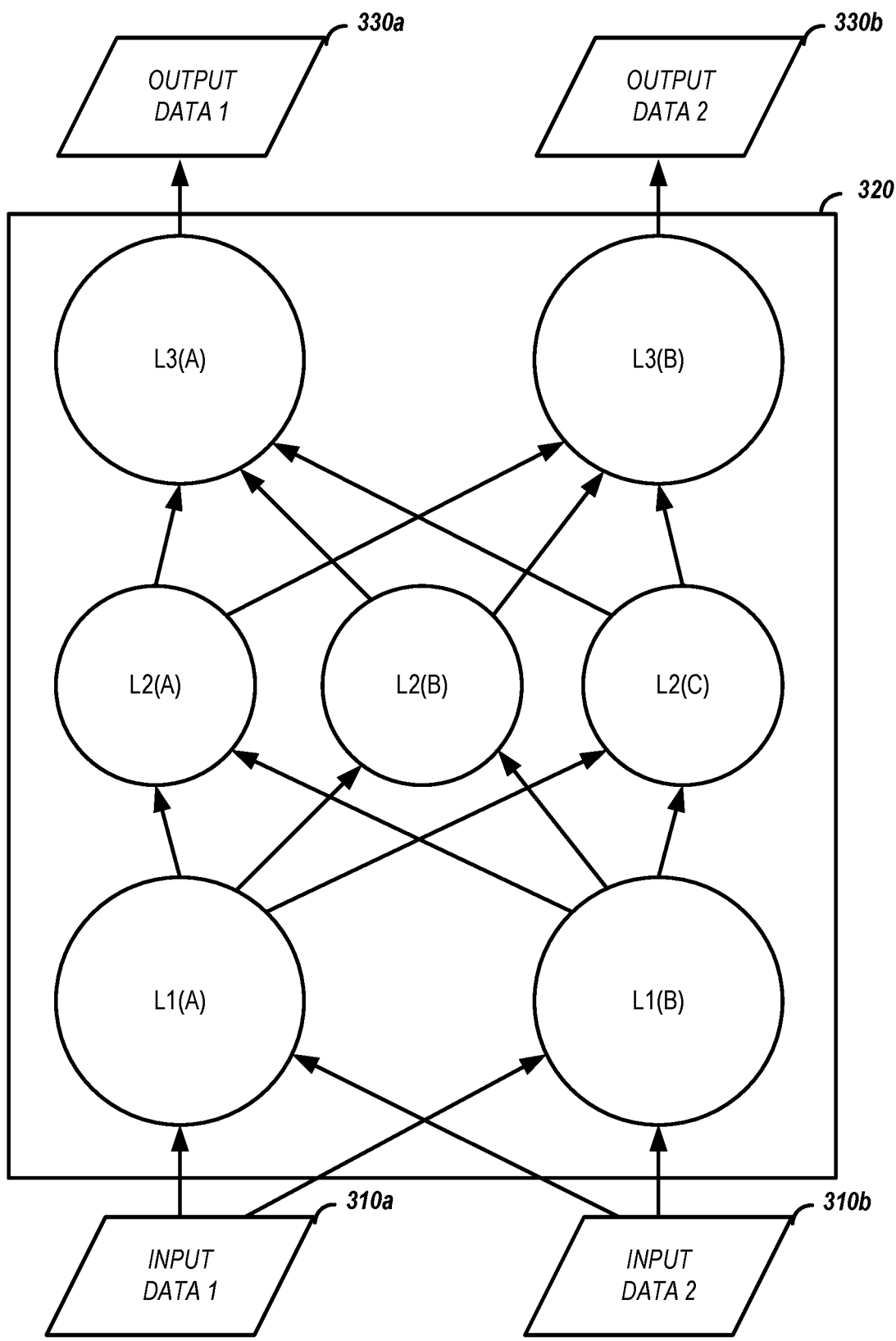
FIG. 3 is a node diagram illustrating an example neural network.

FIG. 3 is a node diagram illustrating an example neural network. The neural network model 320 includes six hidden nodes: two nodes at a first layer (L1(A) and L1(B)), three nodes at a second layer (L2(A), L2(B), and L2(C)), and two nodes at a third layer (L3(A) and L3(B)). The layers may include additional or fewer nodes than shown in FIG. 3. The neural network model 320 may be trained on input data such as input data 310a and input data 310b. The neural network model 320 shown in FIG. 3 provides two output data sets 330a and 330b. The output of the neural network model 320 may be the the output data set 330a and the output data set 330b. The output from the neural network model 320 may have a shape. The shape may characterize the "look and feel" of the output. For example, the shape may identify the size of a vector of values or the data type of specific values in the output. An output value may be a specific element included in an output data set 330a as the result of processing specific input values. For example, an output value may be a value in an output vector indicating the likelihood a user associated with the input values to a model would be interested in a related item.

In some implementations, each layer may process over 100,000 parameter values. Furthermore, the model 320 shown includes three layers. However, the number of layers may be increased to 4, 5, 7, 12, or even 30 layers. To further emphasize the complexity of the models, the number of nodes at each layer is shown as being two in FIG. 3, but can be increased to factors of ten or one hundred in some implementations. The first layer including hidden nodes L1(A) and L1(B) may be referred to as the input receiving hidden node layer because this hidden node layer is the hidden node layer which first receives the input vector data provided to the model. The third layer including hidden nodes L3(A) and L3(B) may be referred to as the output producing hidden node layer because this hidden node layer is the hidden node layer which produces the output value for the model. The lines connecting each node are each associated with a weight. The lines may be referred to as a path.

Figure 4:
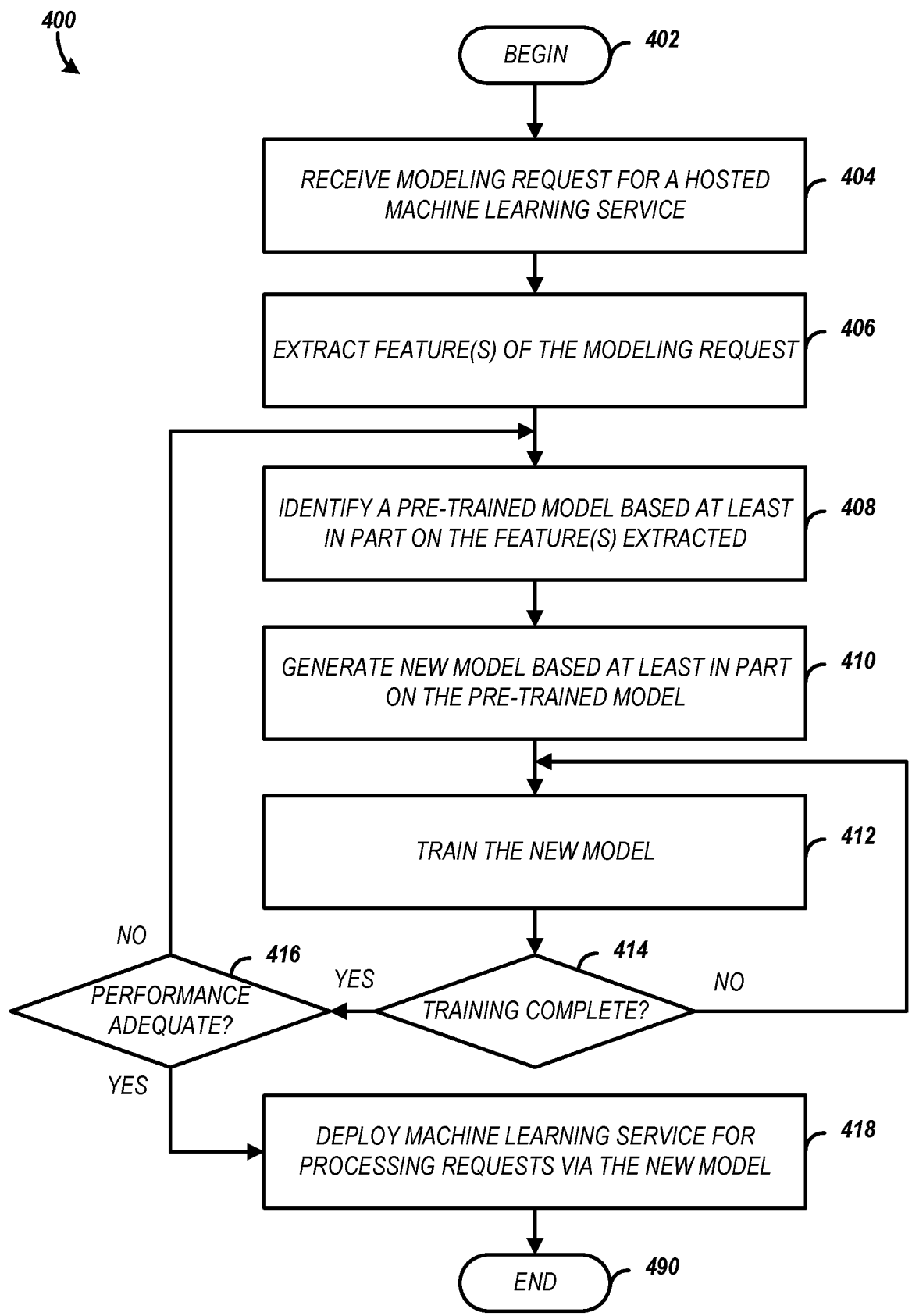
FIG. 4 is a process flow diagram showing an example of a method for generating an image model.

FIG. 4 is a process flow diagram showing an example of a method for generating an image model. The method 400 may be implemented by a computing device such as the network service provider server 220 shown in FIG. 2 under the control of one or more processor. The method 400 illustrates one embodiment for taking a modeling request and efficiently generating a machine learning service using a previously trained models.

The method 400 begins at block 402. At block 404, a request for a hosted modeling service is received from an electronic communication device. In some embodiments, the request identifies a task for the model to perform, and training data including input(s) and expected model output(s). The task may include one of: identifying a location of an object within an image, identifying the object within the image, predicting a response for a set of input(s), recognition of letters, words, utterances, or intents represented in the input (e.g., image or audio), or the like.

At block 406, the controlling device may extract one or more features of the modeling request. Extracting the features may include identifying a specified value from the modeling request such as the model type or an identifier for a client requesting the modeling service. Extracting the features may include generating a value based on the information included in the modeling request. For example, information identifying the shape of the input(s) or output(s) may be generated.

At block 408, the controlling device may identify a pre-trained model are from a library of machine learning models. The identification may be based at least in part on the information extracted at block 406. The extracted information may be compared to the information associated with pre-trained models included in the library of models. The comparison may include determining whether a value associated with the modeling request corresponds with a value for a pre-trained model. As used herein, the term "correspond" encompasses a range of relative relationships between two or more elements. Correspond may refer to equality (e.g., match). Correspond may refer to partial-equality (e.g., partial match, fuzzy match, soundex). Correspond may refer to a value which falls within a range of values.

At block 410, the new model is generated using the pre-trained model identified at block 408. In some embodiments, generating the model may include generating a layer that normalizes or shapes the input to or output of the pre-trained model to conform to the requested model. The generation of the new model may include modifying a portion of the pre-trained model. The modification may include adding new nodes to a layer, removing nodes from a layer, or adjusting a hyperparameter for a node or layer of nodes. The type of modification may be based on the complexity of the requested model. For example, if the fidelity of the classification desired is higher than the fidelity of the pre-trained model, it may be desirable to include more nodes in a hidden layer to provide more evaluation paths within the neural network.

At block 412, the new model may be trained. Training the new model may be based on training data identified by the modeling request. For example, a model can be trained using customer data that includes input data and the correct or preferred output of the model for the corresponding input data. The model can be used to process the input data, and the parameters of the model can be modified until the model produces (or "converges" on) the correct or preferred output. For instance, a correct output of an image recognition model would be the generating an output that identifies the subject included in the image.). This allows the model to evolve by adjusting the weight values to affect the output for one or more hidden nodes. The changing of weight values may be performed through a variety of methods such as random weight updates or backward propagation sometimes referred to as "back propagation." Back propagation includes comparing the expected model output with the obtained model output and then traversing the model to determine the difference between the expected node output that produces the expected model output and the actual node output. An amount of change for one or more of the weight values may be identified using this difference such that the model output more closely matches the expected output.

In some implementations, the pre-trained model may include information identifying layers which updated or layers which cannot be changed. The training may include using hyperparameters that were used to train the pre-trained model. Hyperparameters may include learning rate, number of clusters, or another parameter to direct the machine learning process. A hyperparameter may also refer to a parameter of a node (e.g., activation coefficients) or a layer of the model (e.g., dropout threshold identifying a number of units in a layer to remove; number of units in the layer; etc.).

At block 414, the controlling device may determine whether the training process is complete. The determination may be based on the accuracy of the outputs generated by the new model for a set of inputs. In some implementations, the completion may be based on time spent training (e.g., number of minutes of training or arriving at a stop time). The accuracy of the outputs may be compared to an accuracy threshold or other target accuracy metric. In some implementations, the completion may be based on resources spent training such as processor time, processor cycles, memory utilization, or other detectable characteristic of the system.

If the determination at block 414 is negative, the method 400 may return to block 412 to continue training. If the determination at block 414 is affirmative, the method 400 may proceed to block 416. At block 416, the controlling device may determine whether the performance of the new model is adequate. Adequacy of a model may be assessed based on a correspondence between the accuracy of the model and a target accuracy threshold. The adequacy of a model may additionally or alternatively be assessed based on a correspondence of a performance metric for the model and a target performance metric (e.g., latency or resource utilization for processing an input), The adequacy of the model may additionally or alternatively be assessed based on a correspondence of a physical characteristic of the model and a target characteristic level (e.g., number of layers, number of nodes, memory utilized to store the model).

At block 418, the controlling device may deploy the machine learning service for processing requests with the new model. The machine learning service may include may be deployed in a virtual private cloud or other virtualized environment. Deployment may include activating a network address to receive requests including input information to be processed by the machine learning service. The virtualized environment may be instantiated within an execution container allocated for the domain associated with the client. The method 400 may end at block 490, but may be repeated to generate additional machine learning services.

Figure 5:
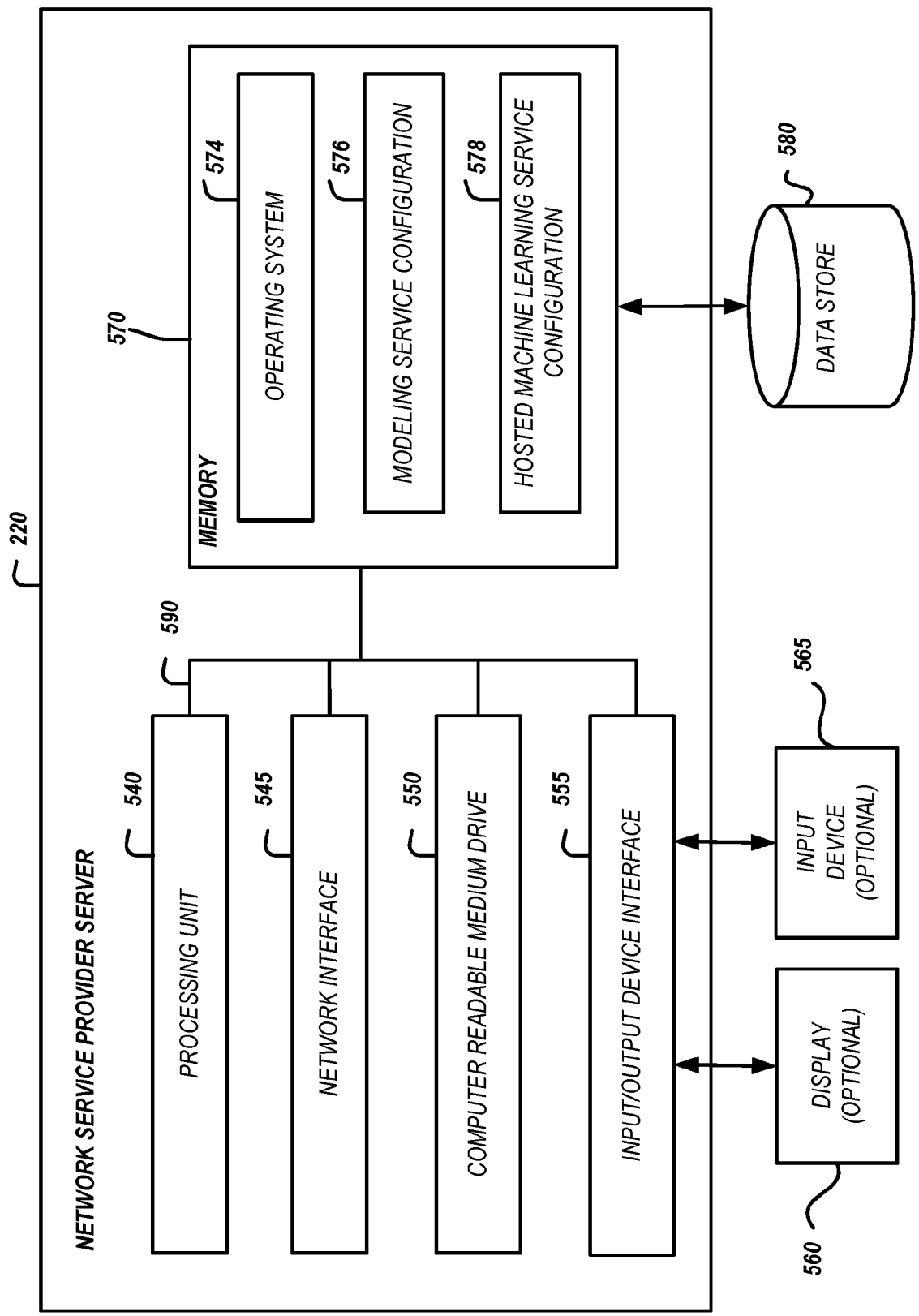
FIG. 5 is a block diagram depicting an illustrative architecture for a computing device providing modeling services.

FIG. 5 is a block diagram depicting an illustrative architecture for a computing device providing modeling services. An embodiment of the network service provider server 220 shown in FIG. 5 includes a processing unit 540, a network interface 545, a computer readable medium drive 550, an input/output device interface 555, and a memory 570. The network interface 545 provides connectivity to one or more networks or computing systems such as the network 210 shown in FIG. 2. The processing unit 540 receives information and instructions from other computing systems or services via the network interface 545. In some embodiments, the network interface 545 stores data directly to memory 570. The processing unit 540 communicates to and from the memory 570 and outputs information to an optional display 560 via the input/output device interface 555. In some embodiments, the input/output device interface 555 accepts input from an optional input device 565, such as a keyboard, mouse, digital pen, microphone, mass storage device, etc.

The memory 570 generally includes RAM, ROM, and/or other persistent, non-transitory computer readable media. The memory 570 stores an operating system 574 that provides computer program instructions for use by the processing unit 540 or other elements included in the computing device in the general administration and operation of the network service provider server 220. In some embodiments, the memory 570 further includes computer program instructions and other information for implementing aspects of generating models described.

For example, in some embodiments, the memory 570 includes a modeling service configuration 576. The modeling service configuration 576 includes thresholds or other values to support the modeling operations, such as generating a model and an associated hosted machine learning service, described herein. The memory 570 shown in FIG. 5 also stores a hosted machine learning service configuration 578. The hosted machine learning service configuration 578 includes the configuration information for a specific hosted machine learning service such as the model supporting the hosted machine learning service, security information for the hosted machine learning service, or other service parameters for providing and executing the hosted machine learning service to a network service client or an access device.

In some embodiments, the configurations store specific values for a given configuration. For example, in some embodiments, the values are provided in a look up table indexed by one or more characteristics of the model or the information upon which the model was generated (e.g., a modeling request value, taxonomies, raining data, training data metrics, or training result(s)).

Rather than storing express values for a particular configuration element, one embodiment stores information that allows the network service provider server 220 to obtain a dynamically generated value for the given configuration element. For example, the identity of the default constraint engine may be specified as a network location (e.g., URL) in conjunction with username and password information to access the network location to obtain the modeling or hosted machine learning service parameters used by the network service provider server 220.

In the embodiment shown in FIG. 5, the memory 570 communicates with one or more auxiliary data stores, such as a data store 580. The data store 580 electronically stores data generated by the network service provider server 220 such as in servicing modeling requests, training models, providing hosted machine learning services, and the like.

The elements included in the network service provider server 220 are coupled by a bus 590. The bus 590 includes one or more of: a data bus, communication bus, or other bus mechanism to enable the various components of the network service provider server 220 to exchange information.

In some embodiments, the network service provider server 220 includes additional or fewer components than are shown in FIG. 5. For example, a network service provider server may include more than one processing unit 540 and/or computer readable medium drive 550. In another example, the network service provider server 220 may not be coupled to a display (e.g., the display 560) or an input device (e.g., the input device 565). In some embodiments, two or more network service provider servers together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a network service provider server, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A network service provider server can be or include a microprocessor, but in the alternative, the network service provider server can be or include a controller, microcontroller, or state machine, combinations of the same, or the like configured to generate and publish hosted machine learning services backed by a machine learning model. A network service provider server can include electrical circuitry configured to process computer-executable instructions. Although described herein primarily with respect to digital technology, a network service provider server may also include primarily analog components. For example, some or all of the modeling and service algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a network service provider server, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the network service provider server such that the network service provider server can read information from, and write information to, the storage medium. In the alternative, the storage medium can be integral to the network service provider server. The network service provider server and the storage medium can reside in an ASIC. The ASIC can reside in a user terminal. In the alternative, the network service provider server and the storage medium can reside as discrete components in a user terminal (e.g., access device or network service client device).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some embodiments, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some embodiments, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some embodiments, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™, .NET™, web services, and rich site summary (RSS). In some embodiments, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A computer-implemented method comprising:
    under control of one or more processors,
        receiving, from an electronic communication device, a request for a machine learning model, wherein the request identifies:
            (i) an input type to be received by the machine learning model,
            (ii) an output type to be provided by the machine learning model, and
            (iii) training data for the machine learning model;
        identifying a shape of an input of the input type for the machine learning model, wherein the shape indicates at least one of a number of input values or a data type for an input value to the machine learning model;
        identifying, from a library of machine learning models, a trained machine learning model, wherein identifying the trained machine learning model is based at least partly on at least one of the input type or the output type identified in the request;
        determining that the shape of the input of the input type for the machine learning model corresponds to a trained model input shape for the trained machine learning model; and
        generating the machine learning model using the trained machine learning model and the training data, wherein generating the machine learning model comprises:
            modifying a layer of the trained machine learning model to provide an output of the output type identified in the request or receive the input type identified in the request, and
            training at least a portion of the machine learning model using the training data.

2. The computer-implemented method of claim 1, wherein modifying the layer of the trained machine learning model comprises adding a node to the layer of the trained machine learning model.

3. The computer-implemented method of claim 1, further comprising:
    receiving, from the electronic communication device, an image for processing by the machine learning model;
    retrieving the machine learning model;
    processing the image using the machine learning model to generate an image processing result, the image processing result including at least one of segmentation information or classification information for an object shown in the image; and
    transmitting the image processing result to the electronic communication device.

4. The computer-implemented method of claim 1, further comprising:
    receiving, from the electronic communication device, audio data for processing by the machine learning model;
    processing the audio file using the machine learning model to generate a language processing result, the language processing result including at least one of: (i) a transcription of an utterance encoded by the audio data, or (ii) an intent for the utterance encoded by the audio data; and
    transmitting the language processing result to the electronic communication device.

5. A system comprising:
    one or more computing devices having a processor and a memory, wherein the one or more computing devices execute computer-readable instructions to at least:
        receive, from an electronic communication device, a request for a machine learning model, wherein the request identifies:
            (i) training data for the machine learning model, and
            (ii) an output type to be provided by the machine learning model;
        identify a first trained machine learning model, wherein the first trained machine learning model is associated with model metadata describing the first trained machine learning model, and wherein the one or more computing devices execute the computer-readable instructions to identify the first trained machine learning model based at least in part on a comparison of the model metadata and metadata included in the request; and
        generate the machine learning model using the first trained machine learning model, wherein to generate the machine learning model the one or more computing devices execute computer-readable instructions to at least:
            modify a layer of the first trained machine learning model to provide an output of the output type identified in the request, and
            train at least a portion of the machine learning model using the training data associated with the request.

6. The system of claim 5, wherein the one or more computing devices execute computer-readable instructions to at least:
    identify a shape of the output of the output type for the machine learning model, wherein the shape indicates at least one of a number of output values or a data type for an output value to the machine learning model; and determine that the shape corresponds to a trained model output shape for the first trained machine learning model.

7. The system of claim 5, wherein to modify the first trained machine learning model, the one or more computing devices execute computer-readable instructions to at least:

add a node to the layer of the first trained machine learning model.

8. The system of claim 5, wherein to identify the first trained machine learning model, the one or more computing devices execute computer-readable instructions to at least:

identify the first trained machine learning model and a second trained model based at least in part on the request;

generate a first accuracy metric for the first trained machine learning model based at least partly on processing of a portion of the training data with the first trained machine learning model;

generate a second accuracy metric for the second trained model based at least partly on processing of the portion of the training data with the second trained model; and determine that the first accuracy metric indicates a higher level of accuracy than the second accuracy metric.

9. The system of claim 5, wherein the one or more computing devices execute computer-readable instructions to at least:

determine that an accuracy of an output provided by the machine learning model corresponds to a target accuracy; and activate a network address to receive an input for processing via the machine learning model.

10. The system of claim 5, wherein the one or more computing devices execute computer-readable instructions to at least:

receive, from the electronic communication device, audio data for processing by the machine learning model;

process the audio file using the machine learning model to generate a language processing result, the language processing result including at least one of: (i) a transcription of an utterance encoded by the audio data, or (ii) an intent for the utterance encoded by the audio data; and transmit the language processing result to the other computer device.

11. The system of claim 5, wherein the one or more computing devices execute computer-readable instructions to at least:

receive, from the electronic communication device, an image for processing by the machine learning model;

retrieve the machine learning model;

process the image using the machine learning model to generate an image processing result, the image processing result including at least one of segmentation information or classification information for an object shown in the image; and transmit the image processing result to the electronic communication device.

12. The system of claim 5, wherein the one or more computing devices execute computer-readable instructions to at least:

identify the layer of the first trained machine learning model to be modified, wherein identifying the layer is based at least in part on annotation information associated with the first trained machine learning model.

13. A computer-implemented method comprising:

under control of one or more processors, receiving, from an electronic communication device, a request for a machine learning model, wherein the request identifies:

(i) training data for the machine learning model, and (ii) an output type to be provided by the machine learning model;

identifying a topical domain for a user associated with the request;

identifying a first trained machine learning model based at least partly on the request, wherein identifying the first trained machine learning model comprises determining that the topical domain relates to a domain associated with the first trained machine learning model; and generating the machine learning model using the first trained machine learning model, wherein generating the machine learning model comprises:

modifying a layer of the first trained machine learning model to provide an output of the output type identified in the request, and training at least a portion of the machine learning model using the training data associated with the request.

14. The computer-implemented method of claim 13, further comprising:

identifying a shape of the output of the output type for the machine learning model, wherein the shape indicates at least one of a number of output values or a data type for an output value to the machine learning model; and determining that the shape corresponds to a trained model output shape for the first trained machine learning model.

15. The computer-implemented method of claim 13, wherein modifying the first trained machine learning model comprises updating a hyperparameter for a layer of the first trained machine learning model.

16. The computer-implemented method of claim 13, wherein identifying the first trained machine learning model comprises:

identifying the first trained machine learning model and a second trained model based at least in part on the request;

generating a first accuracy metric for the first trained machine learning model based at least partly on processing of a portion of the training data with the first trained machine learning model;

generating a second accuracy metric for the second trained model based at least partly on processing of the portion of the training data with the second trained model; and determining that the first accuracy metric indicates a higher level of accuracy than the second accuracy metric.

17. The computer-implemented method of claim 13, wherein the first trained machine learning model is associated with model metadata describing the first trained machine learning model, and wherein identifying the first trained machine learning model is based at least in part on a comparison of the model metadata and metadata included in the request.

18. The computer-implemented method of claim 13, wherein modifying the layer of the first trained machine learning model comprises adding a node to the layer of the first trained machine learning model.

19. The computer-implemented method of claim 13, further comprising:

receiving, from the electronic communication device, audio data for processing by the machine learning model;

processing the audio file using the machine learning model to generate a language processing result, the language processing result including at least one of: (i) a transcription of an utterance encoded by the audio data, or (ii) an intent for the utterance encoded by the audio data; and transmitting the language processing result to the electronic communication device.

20. The computer-implemented method of claim 13, wherein modifying the layer of the first trained machine learning model comprises removing a node from the layer of the first trained machine learning model.

* * * * *